I. H. GORDON.
SCREW CHUCK.
APPLICATION FILED DEC. 16, 1910.

1,004,415.

Patented Sept. 26, 1911.

Witnesses

Inventor
I. H. Gordon
By _____, Attorneys

UNITED STATES PATENT OFFICE.

IPHUS H. GORDON, OF LYNDONVILLE, VERMONT.

SCREW-CHUCK.

1,004,415.  Specification of Letters Patent.  Patented Sept. 26, 1911.

Application filed December 16, 1910. Serial No. 597,670.

*To all whom it may concern:*

Be it known that I, IPHUS H. GORDON, citizen of the United States, residing at Lyndonville, in the county of Caledonia and State of Vermont, have invented certain new and useful Improvements in Screw-Chucks, of which the following is a specification.

This invention relates to improvements in screw chucks employed for holding work upon wood turning lathes. These chucks are provided on their work holding ends with a tapering recess which is screw threaded for engagement with the work to be turned. The piece of wood to be turned, which is square in section, is inserted in the ends of the chuck while the chuck is revolving, and the screw threads of the chuck engage with the work, thus holding them in position. These screw chucks as ordinarily made are defective in that when the stub of wood left, after turning, is knocked out of the chuck, splinters and small chips detached from the corners of the square stick are left in the threads filling them up and preventing the proper engagement of the threads with new work until the threads are cleaned out. The threads have to be cleaned out very frequently, and if several thousand pieces are turned each day, it will be seen that constant clearing of the screw-threads causes a great loss of time and is extremely inconvenient and annoying. In order to obviate this trouble I form my improved chuck with radial slots intersecting the tapering screw-threaded recess. With this construction the little pieces of chips and fragments of wood left in the screw threads of the chuck by one stick when it is knocked out, are forced around and out through the slots by the next stick inserted. Furthermore, by providing means for thus cleaning out the chuck threads, I can make the screw-threads deeper than usually employed upon these chucks, and the end of the piece of work will not have to be inserted so far into the chuck before it tightens sufficiently to hold, thus saving nearly one-half inch in length on each and every stick or piece of work. Where several thousand pieces of work are turned each day, it will be obvious that this saving of one-half inch on each stick will mean a considerable saving of money in a short time.

Figure 1:
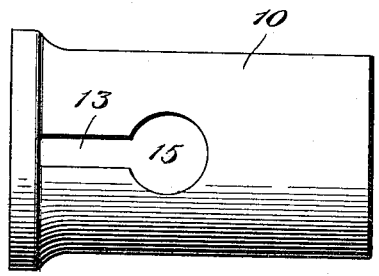
Figure 2:
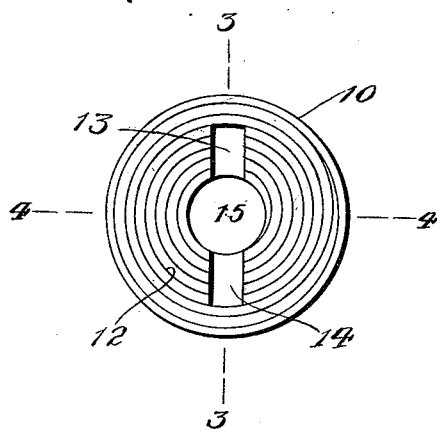
Figure 3:
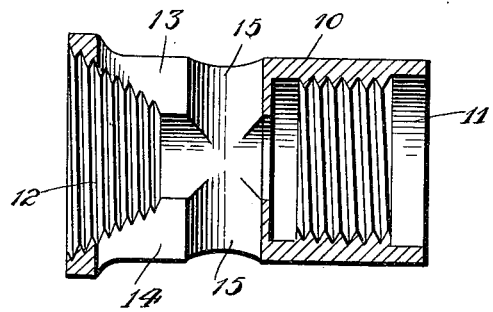
Figure 4:
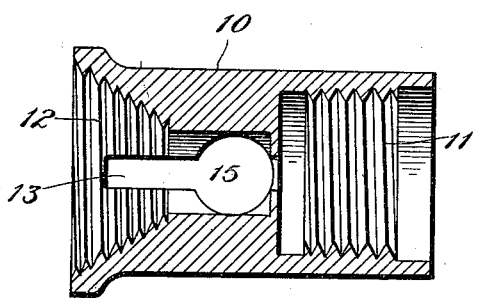

In the drawings illustrative of the preferred embodiment of the invention, Figure 1 represents a side elevation of a conventional chuck constructed in accordance with the invention; Fig. 2 is a front elevation of the same; Fig. 3 is a section on the line 3—3 of Fig. 2; Fig. 4 is a section on the line 4—4 of Fig. 2.

Corresponding and like parts are referred to in the following description and indicated in all the views of the drawings by the same reference characters.

The improved chuck comprises a body 10, preferably circular, and with an internal thread 11 at one end to enable the chuck to be coupled to the mandrel and with a conical or tapered opening in the opposite end and provided with a V thread 12. The V threads are knife-edged in form so that they firmly hold the wood member, which is to be turned, when inserted therein. Formed through the body 10 and transecting the conical threaded opening are oppositely arranged slots 13—14, and formed through the body between the two sets of threads 11—12 is a larger opening 15 for the insertion of a wrench with which the slots 13—14 communicate, as shown.

It will be seen that the slots extend radially through the head 10 and communicate with the conical threaded recess and that therefore any chips or small fragments of wood which may be left in the chuck threads by one piece of work may be easily detached from the screw threads when the new piece of work is inserted. This new piece of work simply forces the fragments and pieces around and out through the slots 13. Thus, the fragments do not obstruct the threads and there is no impediment to the proper engagement by the chuck of the new work. Furthermore, no time need be spent in cleaning the chuck as this is done by the work itself when it is inserted. Ordinarily, a stub of two and a half inches is left on after every piece of work has been turned, which stub must be knocked out of the chuck. By providing the radial slots 13 and thus providing for clearing out the chuck threads, I can make the threads of the chuck deeper, and hence the end of the square stick of wood being turned need not be forced into the chuck so far before it tightens sufficiently to hold. As a consequence, there is a saving of about half an inch in length on each stick turned. While the slots need not be carried back so as to open into the transverse passage 15, yet I have found that this also tends to make easier the removal of the chips and splinters by the newly inserted work.

Having thus described the invention, what is claimed as new is:

1. A chuck of the class described comprising a body having a tapered threaded recess, and slots extending transversely through the head and intersecting the threaded recess.

2. A chuck of the class described comprising a body having a tapered threaded recess, slots extending radially through the head and intersecting the recess, and an aperture extending through the head rearwardly of the recess and communicating with the same said slots opening each at one end into the aperture.

In testimony whereof, I affix my signature in presence of two witnesses.

IPHUS H. GORDON. [L. S.]

Witnesses:
E. J. BLODGETT,
J. T. SMITH.

Copies of this patent may be obtained for five cents each, by addressing the "Commissioner of Patents, Washington, D. C."